US012560115B2

(12) United States Patent
Homma et al.

(10) Patent No.: US 12,560,115 B2
(45) Date of Patent: Feb. 24, 2026

(54) COOLING SYSTEM FOR AN INTERNAL COMBUSTION ENGINE

(71) Applicant: MITSUBISHI JIDOSHA KOGYO KABUSHIKI KAISHA, Tokyo (JP)

(72) Inventors: Fumihiro Homma, Tokyo (JP); Kentaro Baba, Tokyo (JP); Hideki Sato, Tokyo (JP); Shinsaku Tomita, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/840,326

(22) PCT Filed: Mar. 22, 2023

(86) PCT No.: PCT/JP2023/011119
§ 371 (c)(1),
(2) Date: Aug. 21, 2024

(87) PCT Pub. No.: WO2023/189900
PCT Pub. Date: Oct. 5, 2023

(65) Prior Publication Data

US 2025/0163843 A1 May 22, 2025

(30) Foreign Application Priority Data

Mar. 31, 2022 (JP) ................................ 2022-057787

(51) Int. Cl.
*F01P 7/14* (2006.01)
*F01P 3/18* (2006.01)
(Continued)

(52) U.S. Cl.
CPC ................. *F01P 7/167* (2013.01); *F01P 3/18* (2013.01); *B60H 2001/00307* (2013.01); *F01P 2007/146* (2013.01)

(58) Field of Classification Search
CPC .... F01P 2007/146; F01P 7/14; F01P 2060/04; F01P 7/167; F01P 7/16; F01P 2060/00;
(Continued)

(56) References Cited

U.S. PATENT DOCUMENTS

| | | | | |
|---|---|---|---|---|
| 5,002,026 A | * | 3/1991 | Ohkumo | F02D 31/005 |
| | | | | 123/585 |
| 2012/0048504 A1 | | 3/2012 | Park et al. | |
| 2018/0245503 A1 | * | 8/2018 | Toyama | F01P 7/048 |

FOREIGN PATENT DOCUMENTS

| | | | | |
|---|---|---|---|---|
| CN | 202055939 U | * | 11/2011 | F02G 5/02 |
| CN | 106904070 B | * | 11/2019 | B60K 7/0007 |

(Continued)

OTHER PUBLICATIONS

The International Search Report (PCT/ISA/210) issued in PCT/JP2023/011119, mailed on Apr. 25, 2023.

*Primary Examiner* — George C Jin
*Assistant Examiner* — Teuta B Holbrook
(74) *Attorney, Agent, or Firm* — Birch, Stewart, Kolasch & Birch, LLP

(57) ABSTRACT

A cooling system for an internal combustion engine is equipped with an air conditioner having a heat exchanger, a first passage connected to the heat exchanger and supplies cooling water of the engine to the heat exchanger, a second passage connected to a cooling apparatus for oil which fills a speed change mechanism connected to the engine or for oil which fills the engine and which supplies the cooling water to the cooling apparatus, a flow control valve configured to control the flow rate of the cooling water to the first passage and the second passage, and a controller configured to control the engine and the flow control valve. When the temperature of the oil is higher than the temperature of the cooling water, the controller performs a first control which
(Continued)

controls the flow control valve to a position in which the first passage and the second passage are open.

6 Claims, 4 Drawing Sheets

(51) Int. Cl.
  *F01P 7/16* (2006.01)
  *B60H 1/00* (2006.01)
(58) Field of Classification Search
  CPC ...... F01P 2023/08; F01P 7/00; F01P 2060/08;
          F01P 2037/02; B60H 1/00271; B60H
                                    2001/00307
  USPC ............................................... 123/41.08, 362
  See application file for complete search history.

(56) References Cited

FOREIGN PATENT DOCUMENTS

| | | | | |
|----|----------------|---|--------|------------------|
| JP | 2010-196649  A | | 9/2010 | |
| JP | 2012-46163  A  | | 3/2012 | |
| JP | 2013-173447  A | | 9/2013 | |
| JP | 2017-110580  A | | 6/2017 | |
| KR | 20200111546  A | * | 9/2020 | .............. F01P 7/165 |
| KR | 20220022640  A | * | 2/2022 | ........... F02D 41/068 |

* cited by examiner

[Fig 1]
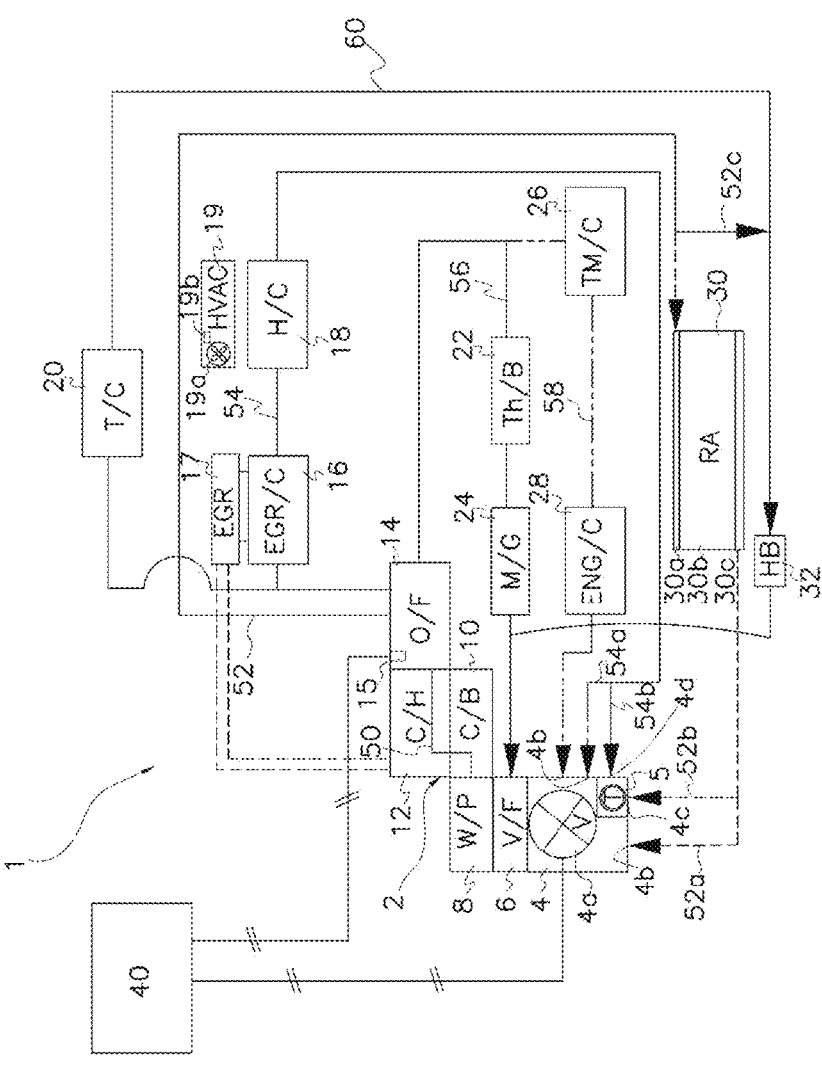

【Fig 2 】
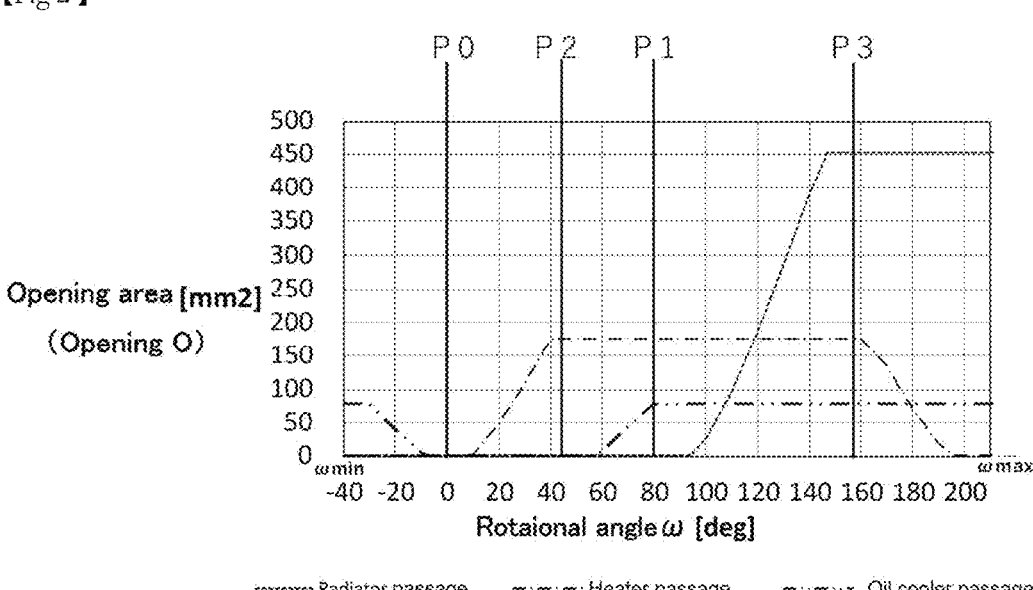

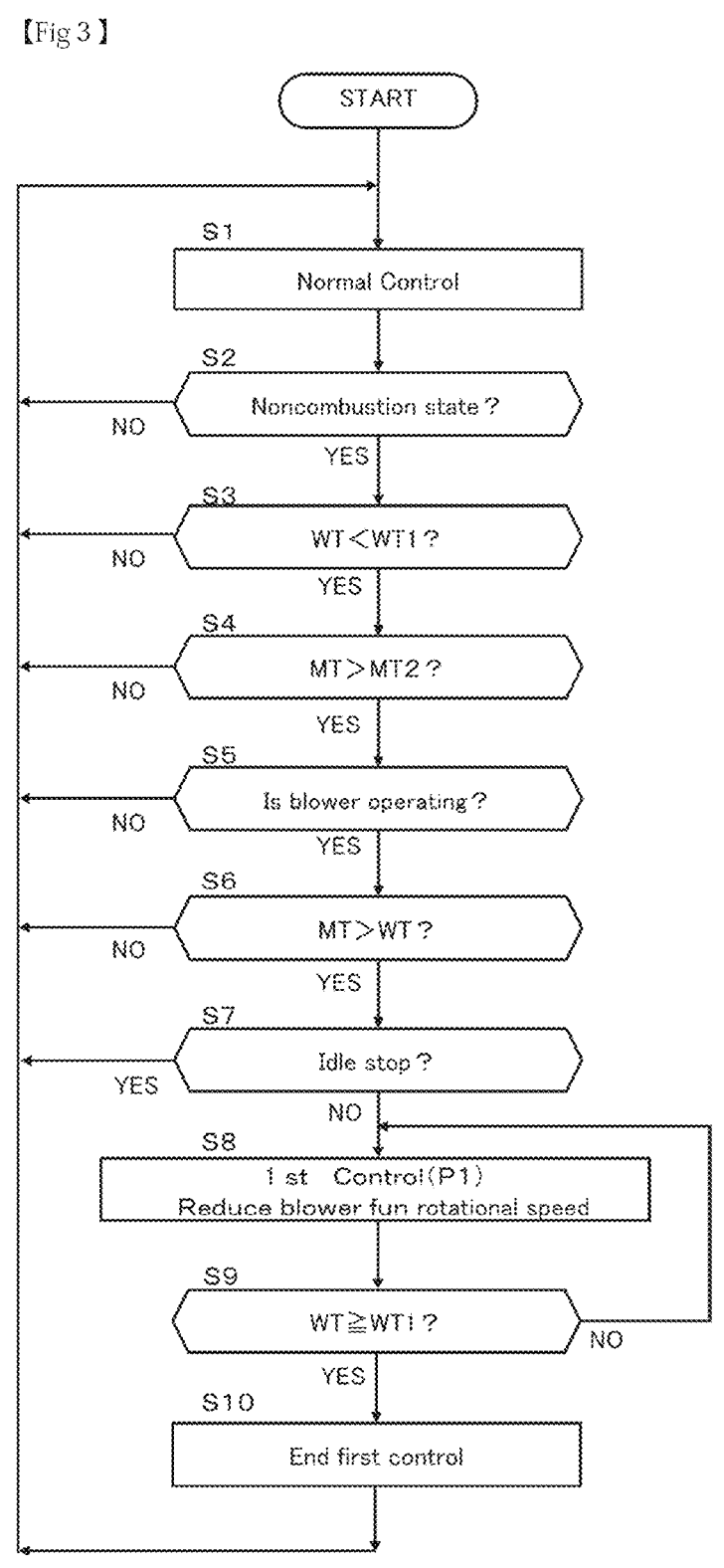

【Fig 3 】

START

S1 Normal Control

S2 Noncombustion state ?　NO

YES

S3 WT<WT1 ?　NO

YES

S4 MT>MT2 ?　NO

YES

S5 Is blower operating ?　NO

YES

S6 MT>WT ?　NO

YES

S7 Idle stop ?　YES

NO

S8 1 st　Control(P1)
Reduce blower fun rotational speed

S9 WT≧WT1 ?　NO

YES

S10 End first control

【Fig 4 】

| Rotational angle ω | Water temperature WT | Oil temperature MT |
|---|---|---|
| P1 | Less than WT1 | Less than MT1 |
| P2 | | At least MT1 |
| P2 | At least WT1 | – |
| P1 | At least WT2 | ... |
| P3 | At least WT3 | ... |

COOLING SYSTEM FOR AN INTERNAL COMBUSTION ENGINE

TECHNICAL FIELD

This disclosure relates to a cooling system for an internal combustion engine.

BACKGROUND ART

From in the past, cooling systems for internal combustion engines having cooling passages which supply cooling water to components needing cooling such as the cylinder head and an exhaust gas recirculation device of an internal combustion engine have been known (see Patent Document 1, for example). Such a cooling system for an internal combustion engine has a passage which supplies cooling water to a radiator, and the cooling water is cooled by the radiator. Patent Document 1 discloses a cooling system for an internal combustion engine which has a flow control valve which controls the flow through various passages, and which is controlled so that an optimal flow rate of cooling water takes place in each passage.

PRIOR ART DOCUMENTS

Patent Documents

Patent Document 1: Japanese Patent No. JP 6417315

DISCLOSURE OF INVENTION

Problem Which the Invention is to Solve

Patent Document 1 discloses a cooling system for an internal combustion engine which increases the flow of cooling water to a heater so that heating performance does not worsen during idle stop. In addition, Patent Document 1 discloses a cooling system for an internal combustion engine which leaves a cooling passage in a cylinder head open in order to cool the cylinder head during idle stop and suppress knocking. Patent Document 1 does not disclose technology for improving heating performance during a noncombustion state of an internal combustion engine 2.

The object of the present invention is to provide a cooling system for an internal combustion engine which can improve the heating performance of the internal combustion engine.

Means for Solving the Problem

A cooling system for an internal combustion engine according to this disclosure is a cooling system for a vehicle-mounted internal combustion engine, the cooling system having an air conditioner with a heat exchanger mounted on the vehicle, a first passage which is connected to the heat exchanger to supply cooling water from the internal combustion engine to the heat exchanger, a second passage which is connected to a cooling apparatus and which supplies the cooling water to the cooling apparatus, the cooling apparatus being for oil which fills a speed change mechanism which is connected to the internal combustion engine or for oil which fills the internal combustion engine, a flow control valve which is configured to control the flow of cooling water to the first passage and the second passage, and a controller which is configured to control the internal combustion engine and the flow control valve. When the temperature of the oil is higher than the temperature of the cooling water, the controller executes first control which controls the flow control valve to a position which opens the first passage and the second passage.

According to this cooling system for an internal combustion engine, the controller controls the flow control valve to be in a position in which the first passage and the second passage are open. This causes heat to be transmitted to the cooling water from the cooling apparatus through which oil at a higher temperature than the cooling water passes, the cooling water which receives the heat flows through the heat exchanger of the air conditioner, and the heat exchanger is heated. As a result, the heating performance during a non-combustion state of the internal combustion engine is improved.

Effects of the Invention

According to this disclosure, a cooling system for an internal combustion engine which can improve the heating performance of the internal combustion engine can be provided.

BRIEF DESCRIPTION OF THE DRAWINGS

FIG. 1 This is a system diagram of a control system for an internal combustion engine according to an embodiment of this disclosure.

FIG. 2 This is a graph showing an example of the relationship between the opening area (opening) of each passage with respect to the rotational angle of a rotary valve in an embodiment of this disclosure, FIG. 3 This is a flowchart showing the control procedure performed by a controller in an embodiment of this disclosure.

FIG. 4 This is a graph showing the relationship of a target rotational angle to the water temperature and the oil temperature during normal control in an embodiment of this disclosure.

MODES FOR CARRYING OUT THE INVENTION

Below, embodiments of this disclosure will be explained while referring to the drawings. In the following description, the flow direction of cooling water will be used as a reference, with an upstream side with respect to the flow direction of cooling water being indicated as upstream and a downstream side with respect to the flow direction of cooling water being indicated as downstream.

As shown in FIG. 1, a cooling system 1 for an internal combustion engine 2 is an apparatus which cools various equipment of the internal combustion engine 2. The cooling system 1 for the internal combustion engine 2 has a flow control valve (V) 4, a valve fitting (V/F) 6, a water pump (W/P) 8, a cylinder block (C/B) 10, a cylinder head (C/H) 12, an outlet fitting (O/F) 14, an exhaust gas recirculation cooler (EGR/C) 16, a heater core (H/C, which is a type of heat exchanger) 18, a turbocharger (T/C) 20, a throttle (Th/B) 22, a motor generator (M/G) 24, a transmission cooler (TM/C, which is a type of cooling apparatus) 26, an engine oil cooler (ENG/C) 28, a radiator (RA) 30, a hot bottle (HB) 32, and a controller 40. In this embodiment, the internal combustion engine 2 is a reciprocating internal combustion engine 2 which is mounted on a vehicle and in which unillustrated pistons rotate a crankshaft.

The cooling system 1 for the internal combustion engine 2 has a plurality of passages which supply cooling water to various equipment. In this embodiment, the cooling system includes a main engine cooling passage 50, a radiator passage 52, a heater passage (one example of a first passage) 54, a throttle hot water passage 56, an oil cooler passage (one example of a second passage) 58, and a turbocharger cooling passage 60.

The flow control valve 4 is a device which adjusts the amount of cooling water flowing in passages. In this embodiment, it is a device which adjusts the amount of cooling water flowing in the radiator passage 52, the heater passage 54, and the oil cooler passage 58 (in the following description, these may be referred to as "each passage"). In this embodiment, the flow control valve 4 controls the flow rate of cooling water flowing in each passage by varying the amount of opening of the inlet through which cooling water enters the flow control valve 4 from each passage. In this embodiment, the flow control valve 4 is a rotary-type valve having a rotary valve 4*a*. By rotating the rotary valve 4*a*, the flow control valve 4 changes the size of the opening area of the inlet of each passage. The flow control valve 4 can thereby control the flow rate of cooling water flowing in each passage. The flow control valve 4 is electrically connected to the controller 40, and the rotational angle of the valve is controlled by the controller 40. The flow control valve 4 has an unillustrated rotational angle sensor which detects the rotational angle ω of the rotary valve 4*a* and transmits the rotational angle ω of the rotary valve 4*a* to the controller 40.

As inlets for cooling water, the flow control valve 4 has a first inlet 4*b* which is directly connected to the rotary valve 4*a*, a second inlet 4*c* which bypasses the rotary valve 4*a* through a thermostat (T) 5 and which is connected to the valve fitting 6, and a third inlet 4*d* which bypasses an unillustrated thermal valve which opens and closes the second inlet 4*c* of the thermostat 5 and the rotary valve 4*a* and is connected to the valve fitting 6. The thermostat 5 opens the second inlet 4*c* due to melting of paraffin wax when the cooling water reaches a prescribed temperature. The prescribed temperature is a temperature at which there is the possibility of the cooling water boiling and the internal combustion engine 2 overheating. The cooling water which is supplied to the third inlet 4*d* passes the paraffin wax and melts the paraffin wax. The thermostat 5 has a spring which energizes the thermal valve towards the closing direction of the second inlet 4*c*. The thermostat 5 may be an existing type of thermostat 5, so a more detailed description thereof will be omitted.

The valve fitting 6 is a tubular member which is mounted on the cooling water outlet of the flow control valve 4. The water pump 8 which supplies cooling water to each passage is connected downstream of the valve fitting 6. In this embodiment, the water pump 8 is a mechanical pump which receives a drive force from the crankshaft of the internal combustion engine 2 and has a rotating impeller.

The main engine cooling passage 50 is connected downstream of the water pump 8. The main engine cooling passage 50 includes an unillustrated first water jacket which is formed around an unillustrated cylinder of the cylinder block 10 and an unillustrated second water jacket which is formed in the vicinity of the exhaust port of the cylinder head. The main engine cooling passage 50 cools the cylinder block 10 and the cylinder head 12 by passing cooling water through the first water jacket and the second water jacket.

The outlet fitting 14 is a tubular member which distributes cooling water which has passed through the cylinder block

10 and the cylinder head 12 to each passage. In this embodiment, the outlet fitting 14 is installed downstream of the second water jacket of the cylinder head 12. In this embodiment, a water temperature sensor (one example of a temperature sensor) 15 is provided on the outlet fitting 14. The water temperature sensor 15 senses the temperature (the water temperature WT) of the cooling water passing through the outlet fitting 14. In other words, the water temperature sensor 15 senses the cooling water temperature before the cooling water is supplied to each passage. The water temperature sensor 15 is electrically connected to the controller 40 and sends the sensed water temperature WT to the controller 40.

The internal combustion engine 2 in this embodiment has an exhaust gas recirculation apparatus 17 which includes an unillustrated exhaust gas recirculation valve and which introduces exhaust gas from the internal combustion engine 2 into the intake air. The exhaust gas recirculation valve is electrically connected to the controller 40. The amount of exhaust gas which flows into the intake air is adjusted by the exhaust gas recirculation valve. The exhaust gas recirculation cooler (one type of exhaust gas recirculation cooling apparatus) 16 is a heat exchanger which cools recirculated exhaust gas from the internal combustion engine which is introduced by the exhaust gas recirculation apparatus 17 (see the dashed line in FIG. 1) into intake air and cools it using cooling water. The heater core 18 is a heat exchanger of an air conditioner (HVAC) 19 which supplies conditioned air to the vehicle interior. The heater core 18 absorbs heat from the cooling water and heats the conditioned air. The air conditioner 19 includes a blower fan 19*a*. Rotating the blower fan 19*a* supplies conditioned air which was warmed by the heater core 18 to the vehicle interior. The air conditioner 19 includes an air conditioner controller 19*b*. The air conditioner controller 19*b* is electrically connected to the controller 40 by an unillustrated communication wire and can obtain information transmitted from the controller 40. Similarly, the controller 40 can obtain information transmitted from the air conditioner controller 19*b*.

The exhaust gas recirculation cooler 16 and the heater core 18 are connected to the heater passage 54, which is connected to the outlet fitting 14. The exhaust gas recirculation cooler 16 and the heater core 18 supply cooling water to the heater passage 54. The heater passage 54 is a passage formed by a rubber hose, a metal pipe, or the like. Downstream of the heater core 18, the heater passage 54 branches into a first heater passage 54*a* which is connected to the first inlet 4*b* of the flow control valve 4 and a second heater passage 54*b* which is connected to the third inlet 4*d*. The second heater passage 54*b* is a passage for cooling the thermostat 5. Specifically, when the cooling water has reached a high temperature, the cooling water flowing through the second heater passage 54*b* melts the paraffin wax, and when the paraffin wax melts and the second inlet 4*c* opens, cooling water is supplied to the radiator passage 52 regardless of the rotational angle ω of the rotary valve 4*a*.

The turbocharger 20 is a device which turbocharges the intake air for the internal combustion engine 2. The turbocharger cooling passage 60 which branches from the heater passage 54 upstream of the exhaust gas recirculation cooler 16 is connected to the turbocharger 20. Cooling water which flows through the turbocharger cooling passage 60 cools the turbine shaft of the turbocharger 20. The turbocharger cooling passage 60 is connected to the hot bottle 32.

The throttle 22 is a device which controls the air intake of the internal combustion engine 2. The motor generator 24 is a rotating electric machine which is connected to the internal combustion engine 2 and which carries out electricity generation and starting of the internal combustion engine 2. The throttle 22 and the motor generator 24 are connected to the throttle hot water passage 56, which is connected to the outlet fitting 14. The throttle hot water passage 56 is connected to the valve fitting 6 without passing through the radiator 30. The throttle hot water passage 56 prevents freezing of the throttle 22 and the motor generator 24 by carrying cooling water which is normally warmed.

The transmission cooler 26 is a heat exchanger which performs heat exchange between transmission oil which fills the transmission (a type of speed change mechanism) and cooling water so as to heat or cool the transmission oil. The engine oil cooler 28 is a heat exchanger which performs heat exchange between engine oil which fills the internal combustion engine 2 and cooling water and heats or cools the engine oil.

The transmission cooler 26 and the engine oil cooler 28 are connected to the oil cooler passage 58 which branches from the throttle hot water passage 56 upstream of the throttle 22 and supplies cooling water. The oil cooler passage 58 is connected to the first inlet 4b of the flow control valve 4.

The radiator 30 has an unillustrated upper passage 30a, a radiator core 30b which is disposed downstream of the upper passage 30a, and a lower passage 30c which is disposed downstream of the radiator core 30b. The radiator core 30b is a heat exchanger which has a plurality of fins and performs heat exchange between the cooling water and air outside the vehicle in order to cool the cooling water. The upper passage 30a of the radiator 30 is connected to the radiator passage 52 which is connected to the outlet fitting 14. The lower passage 30c of the radiator 30 is connected to a first radiator passage 52a which is connected to the first inlet 4b of the flow control valve 4 and to a second radiator passage 52b which is connected to the second inlet 4c. The radiator passage 52 branches to the first radiator passage 52a and the second radiator passage 52b. Upstream of the radiator 30, the radiator passage 52 also branches to a third radiator passage 52c which is connected to the turbocharger cooling passage 60.

The hot bottle 32 is a tank which functions as a reserve tank which temporarily stores cooling water and removes air from the cooling water. The upstream side of the hot bottle 32 is connected in the turbocharger cooling passage 60 downstream of the junction between the third radiator passage 52c and the turbocharger cooling passage 60. The downstream side of the hot bottle 32 is connected to the throttle hot water passage 56 downstream of the motor generator 24. The hot bottle 32 is supplied with cooling water which has passed through the turbocharger 20.

The controller 40 is an apparatus which controls the flow control valve 4 in accordance with the water temperature WT obtained by the water temperature sensor 15, the operating state of the vehicle, the operating state of the internal combustion engine 2, and the like and controls the flow rate of cooling water. More specifically, the controller 40 determines the opening O of each passage, namely, the target rotational angle ωt of the rotary valve 4a in accordance with the water temperature WT, the operating state of the vehicle, and the operating state of the internal combustion engine 2 and controls the flow of cooling water though each passage.

In the graph in FIG. 2, the horizontal axis indicates the rotational angle ω of the rotary valve 4a, and the vertical axis indicates the opening area (the opening O). The controller 40 determines the target rotational angle ωt in accordance with the water temperature WT, the operating state of the vehicle, and the operating state of the internal combustion engine 2. The controller 40 rotates the rotary valve 4a towards the target rotational angle ωt. When the rotary valve 4a reaches the target rotational angle ωt, the opening O of each passage becomes a value corresponding to the target rotational angle ωt, and the flow rate of cooling water flowing in each passage is controlled. Namely, the controller 40 determining the target rotational angle ωt is the same as the controller 40 determining a target opening Ot. During this time, the controller 40 obtains the actual rotational angle or of the rotary valve 4a from a rotational angle sensor provided in the flow control valve 4 and monitors whether the actual rotational angle is following the target rotational angle.

The flow control valve 4 in this embodiment has a first stopper (a type of regulating member) which controls the rotation of the rotary valve 4a to a position corresponding to the minimum rotational angle ωmin of the rotary valve 4a (in this embodiment, the position is at −40 degrees in FIG. 2, for example). The flow control valve 4 has a second stopper (a type of regulating member) which controls the rotation of the rotary valve 4a to a position corresponding to the maximum rotational angle ωmax (in this embodiment, a position at 210 degrees in FIG. 2, for example). The controller 40 controls the rotary valve 4a so as to be in the region from the first stopper to the second stopper.

The controller 40 determines the mixing proportion in exhaust gas circulation and controls the opening of the exhaust gas recirculation valve so that the amount of recirculated exhaust gas which is introduced becomes the proportion determined with respect to the amount of intake air. The controller 40 may determine the proportion of introduced recirculated exhaust gas based on a map which sets the proportion of introduced exhaust gas for each operating region of the internal combustion engine.

The controller 40 may also perform control of devices such as unillustrated fuel injection valves, unillustrated exhaust gas recirculation valves, the turbocharging pressure of the turbocharger 20, and the like based on values obtained from sensors such as an unillustrated air flow sensor, an unillustrated accelerator position sensor, and the like so that the internal combustion engine 2 achieves a desired operating state. A desired operating state includes fuel cut in which spraying by the fuel injection valves is stopped and idle stop in which rotation of the internal combustion engine 2 is stopped.

The controller 40 is actually an ECU (Electronic Control Unit) constituted by a microcomputer including an arithmetic unit, a memory, an I/O buffer, and the like. The controller 40 controls each device based on a map and a program stored in the memory to achieve a desired operating state. The various types of control are not limited to being performed by software and may also be performed by specialized hardware (electronic circuits).

Next, a control procedure performed by the controller 40 will next be explained using the flowchart in FIG. 3. The controller 40 begins control operation when an unillustrated ignition switch is turned on.

In Step S1, the controller 40 performs usual control (one example of the second control). During normal control, the controller 40 obtains the water temperature WT and the transmission oil temperature MT (referred to below as the oil temperature MT), which is the temperature of the transmission oil which fills the transmission. The oil temperature MT may be obtained by a temperature sensor mounted on the oil pan or the like of the transmission. The controller 40 may also use the temperature of the engine oil which fills the internal combustion engine 2 as the oil temperature MT. The temperature of the engine oil may be obtained by a temperature sensor mounted on the oil pan or the like of the internal combustion engine 2.

As shown in FIG. 4, during normal control, when the water temperature is less than a first prescribed water temperature WT1 and the oil temperature MT is less than a first prescribed oil temperature MT1, the controller 40 sets the rotational angle ω of the rotary valve 4a to a position P1. The first prescribed water temperature WT1 is a temperature of about 60 degrees C., for example. The first prescribed oil temperature MT1 is a temperature of about 10 degrees C., for example. However, the first prescribed water temperature WT1 and the first prescribed oil temperature MT1 may be suitably varied. By rotating the rotary valve 4a to the position P1 in this manner, the controller 40 opens the heater passage 54 and the oil cooler passage 58. As a result, the temperature of the cooling water is transmitted to the transmission oil and the engine oil, and the transmission oil and the engine oil can be heated. Friction in the internal combustion engine 2 and the transmission can thereby be decreased.

When the water temperature WT is less than the first prescribed water temperature WT1 and the oil temperature MT has risen to at least the first prescribed oil temperature MT1, the controller 40 sets the rotational angle ω of the rotary valve 4a to a position P2 and closes the oil cooler passage 58. The controller 40 thereby completes heating control of the engine oil and the transmission oil. By closing the oil cooler passage 58, the controller 40 prevents the heat transmitted from the cooling water from overheating the transmission oil and the engine oil and promotes an increase in the temperature of the cooling water.

When the water temperature WI reaches at least the first prescribed water temperature WT1, the controller 40 maintains the rotational angle ω of the rotary valve 4a at P2. When the water temperature WT reaches at least the second prescribed water temperature WT2, the controller 40 rotates the rotational angle ω of the rotary valve 4a to position P1. As a result, the controller 40 opens the oil cooler passage 58, and the engine oil and the transmission oil are cooled. The second prescribed water temperature WT2 is a temperature of about 79 degrees C., for example.

When the water temperature WT reaches at least the third prescribed water temperature WT3, the controller 40 leaves the rotational angle ω of the rotary valve 4a at P3 or rotates it from P1 to P3 to open the radiator passage 52 and supply cooling water to the radiator 30. The third prescribed water temperature WT3 is about 80 degrees C., for example. Upon performing normal control, the controller 40 proceeds to Step S2.

In Step S2, the controller 40 determines whether the internal composition engine 2 is in a noncombustion state during normal control. A noncombustion state of the internal combustion engine 2 includes idle stop in which the internal combustion engine 2 is temporarily stopped and fuel cut in which the fuel injection valves are not spraying fuel. Fuel cut is carried out when the vehicle is traveling on a downhill slope or the like, the engine 2 is in a noncombustion state, heat is not being generated, and the cooling water is cooled by the breeze produced by movement of the vehicle, so the temperature of cooling water flowing through the heater core 18 decreases. As a result, the heating performance worsens. In order to suppress such a worsening of heating performance, the controller 40 performs the processing in Steps S2 to S8. When the controller 40 determines that the internal combustion engine 2 is in a noncombustion state (YES in Step S2), processing proceeds to Step S3.

In Step S3, the controller 40 obtains the water temperature WT from the water temperature sensor 15 and determines whether the water temperature WI is less than the first prescribed water temperature WT1. For example, there are cases in which the water temperature WI decreases due to fuel cut during normal control and the water temperature WT enters a region in which the water temperature WT is less than the first prescribed water temperature WT1. When the controller 40 determines that the water temperature WI is less than the first prescribed water temperature WT1 (YES in Step S3), processing proceeds to Step S4.

In Step S4, the controller 40 determines whether the oil temperature MT is greater than a second prescribed oil temperature MT2. The second prescribed oil temperature MT2 is a temperature of about 30 degrees, for example. When the controller 40 determines that the oil temperature MT is greater than the second prescribed oil temperature MT2 (YES in Step S4), processing proceeds to Step S5. At this time, the controller 40 is performing normal control, so the rotational angle ω of the rotary valve 4a is positioned at P2.

In Step S5, the controller 40 determines whether the blower fan 19a is operating. When the blower fan 19a is operating, a decrease in the cooling water temperature has a large effect on heating performance. Therefore, when the controller 40 determines that the blower fan 19a is operating (YES in Step S5), processing proceeds to Step S6.

In Step S6, the controller 40 determines whether the oil temperature MT is higher than the water temperature WT. When the oil temperature MT is higher than the water temperature WT, the cooling water can be heated by the oil temperature MT. When the controller 40 determines that the oil temperature MT is higher than the water temperature WT (YES in Step S6), processing proceeds to Step S7.

In Step S7, the controller 40 determines whether idle stop is taking place. In this embodiment, the rotary valve 4a does not rotate during idle stop. When the controller 40 determines that idle stop is not taking place (NO in Step S7), processing proceeds to Step S8.

In Step 8, during normal control, even in a state in which the rotational angle ω of the rotary valve 4a is made P2, the controller 40 performs first control in which the rotational angle ω of the rotary valve 4a is rotated to P1. In other words, the controller 40 performs first control in which the rotary valve 4a is controlled to a position in which the heater passage 54 is open and the oil cooler passage 58 is open. As a result, cooling water flows in the oil cooler passage 58, heat is transmitted from the transmission oil to the cooling water, and the cooling water can be heated. This causes the temperature of cooling water in the heater passage 54 which passes through the heater core 18 to rise, and heating performance is thereby improved.

During the first control, the controller 40 restrains the rotational speed of the blower fan 19a. Specifically, the rotational speed of the blower fan 19a is reduced compared to normal control. As a result, cold air conditioned air can be prevented from being supplied to the vehicle interior. After the controller 40 performs the first control, processing proceeds to Step S9.

In Step S9, the controller 40 determines whether the water temperature WT is at least the first prescribed water temperature WT1 (YES in Step S9). If the controller 40 determines that the water temperature WT is at least the first prescribed' water temperature WT1 (YES in Step S9), processing proceeds to Step S10. In Step S10, the controller 40 completes the first control and processing proceeds to Step S1. During the first control, if the answer is NO in any of Step S2 through Step S6 or if the answer is YES in Step S7, the controller 40 ends the first control, and processing may proceed to Step S1. When the water temperature WT is less than the first prescribed water temperature WT1 (NO in Step S9), processing by the controller 40 proceeds to Step S8, and the first control is continued.

When it is determined in Step S2 that a noncombustion state is not taking place (NO in Step S2), or it is determined in Step S3 that the water temperature is at least the first prescribed water temperature WT1 (NO in Step S3), or it is determined in Step S4 that the oil temperature MT is no higher than the second prescribed oil temperature MT2 (NO in Step S4), or it is determined in Step S5 that the blower fan is not operating (NO in Step S5), or it is determined in Step S6 that the oil temperature MT is no higher than the water temperature WT (NO in Step S6), or it is determined in Step S7 that idle stop is taking place (YES in Step S7), the controller 40 returns to Step S1 without performing the first control, and normal control is performed.

As described above, in a cooling system 1 for an internal combustion engine 2 in this disclosure, the controller controls the rotary valve 4a to a position in which the heater passage 54 and the oil cooler passage 58 are open. As a result, heat is transmitted to the cooling water from the transmission cooler 26 through which oil at a higher temperature than the cooling water passes, and cooling water which has received the heat can flow through the heater core 18. Therefore, the heat exchanger of the air conditioner 19 is heated. As a result, the heating performance during a noncombustion state of the internal combustion engine is improved. In addition, a decrease in the temperature of the cooling water due to operation of the air conditioner 19 can be suppressed, so it is possible to suppress a delay in warming up the internal combustion engine 2.

Other Embodiments

An embodiment of this disclosure has been explained above, but this disclosure is not limited to this embodiment, and various modifications are possible within a scope which does not deviate from the essence of the invention. In particular, a plurality of variations set forth in this description can be freely combined as necessary.

(a) In the above-described embodiment, an example was described in which the flow control valve 4 is a rotary valve 4a, but this disclosure is not limited to a rotary valve. The flow control valve 4 may, for example, be a flow control valve 4 which controls the flow rate through each passage by a slide valve. In this case, a regulating member may be a stopper which regulates the movement of the slide valve.

(b) In the above-described embodiment, an explanation was given using an example in which the controller 40 controls the flow rate of cooling water in each passage using the relationship shown in FIG. 2 between the opening area of each passage and the rotational angle ω of the rotary valve 4a, but this disclosure is not limited to that arrangement. The controller 40 may control the flow control valve 4 using, for example, sensors which sense the flow rate. In addition, the opening area of each passage in FIG. 2 and the rotational angle ω of the rotary valve 4a may be suitably varied.

DESCRIPTION OF SYMBOLS 1 cooling system
2 internal combustion engine 4 flow control valve
18 heater core
19 air conditioner
19a blower fan
26 transmission cooler
40 controller
52 radiator passage
54 heater passage
58 oil cooler passage

The invention claimed is:

1. A cooling system for an internal combustion engine mounted on a vehicle, comprising:

an air conditioner mounted on the vehicle and having a heat exchanger, a first passage connected to the heat exchanger to supply cooling water of the internal combustion engine to the heat exchanger, a second passage connected to a cooling apparatus to supply the cooling water to the cooling apparatus, the cooling apparatus being for oil filling a speed change mechanism connected to the internal combustion engine or for oil filling the internal combustion engine, a flow control valve configured to control the flow rate of cooling water to the first passage and the second passage, and a controller configured to control the internal combustion engine and the flow control valve, wherein the controller is configured to selectively perform a normal control, a first control, and a second control, the normal control being performed when the internal combustion engine is in a combustion state and a noncombustion state;

the first control being performed when the internal combustion engine is in the noncombustion state;

the second control, which is one part of the normal control, being performed when the internal combustion engine is in the noncombustion state, the controller is configured to perform the normal control which controls the flow control valve based on a temperature of the cooling water and a temperature of the oil when the internal combustion engine is in the combustion state and the noncombustion state, and wherein the controller is configured to perform one of:

the first control which controls the flow control valve to a position in which the first passage and the second passage are open when the temperature of the cooling water is less than a prescribed water temperature, the temperature of the oil is at least a prescribed oil temperature, the temperature of the oil is higher than the temperature of the cooling water, and the internal combustion engine is in the noncombustion state, and the second control which controls the flow control valve to a position in which the first passage is open and the second passage is closed when the temperature of the cooling water is below the prescribed water temperature, the temperature of the oil is at least the prescribed oil temperature, the temperature of the oil is lower than the temperature of the cooling water, and the internal combustion engine is in the noncombustion state.

2. A cooling system for an internal combustion engine as claimed in claim 1, wherein the controller is configured to end the first control and subsequently start the normal control when the temperature of the cooling water is equal to or greater than the prescribed water temperature, and the internal combustion engine is in the noncombustion state.

3. A cooling system for an internal combustion engine as claimed in claim 1, wherein the controller is configured to end the first control when the cooling water has reached at least the prescribed water temperature.

4. A cooling system for an internal combustion engine as claimed in claim 1, wherein the air conditioner has a blower fan, and the controller is configured to perform the first control when the blower fan is operating.

5. A cooling system for an internal combustion engine as claimed in claim 4, wherein the controller is configured to restrain the rotational speed of the blower fan during the first control.

6. A cooling system for an internal combustion engine as claimed in claim 1, wherein the controller is configured to perform the first control during fuel cut of the internal combustion engine.

* * * * *